United States Patent Office 3,421,837
Patented Jan. 14, 1969

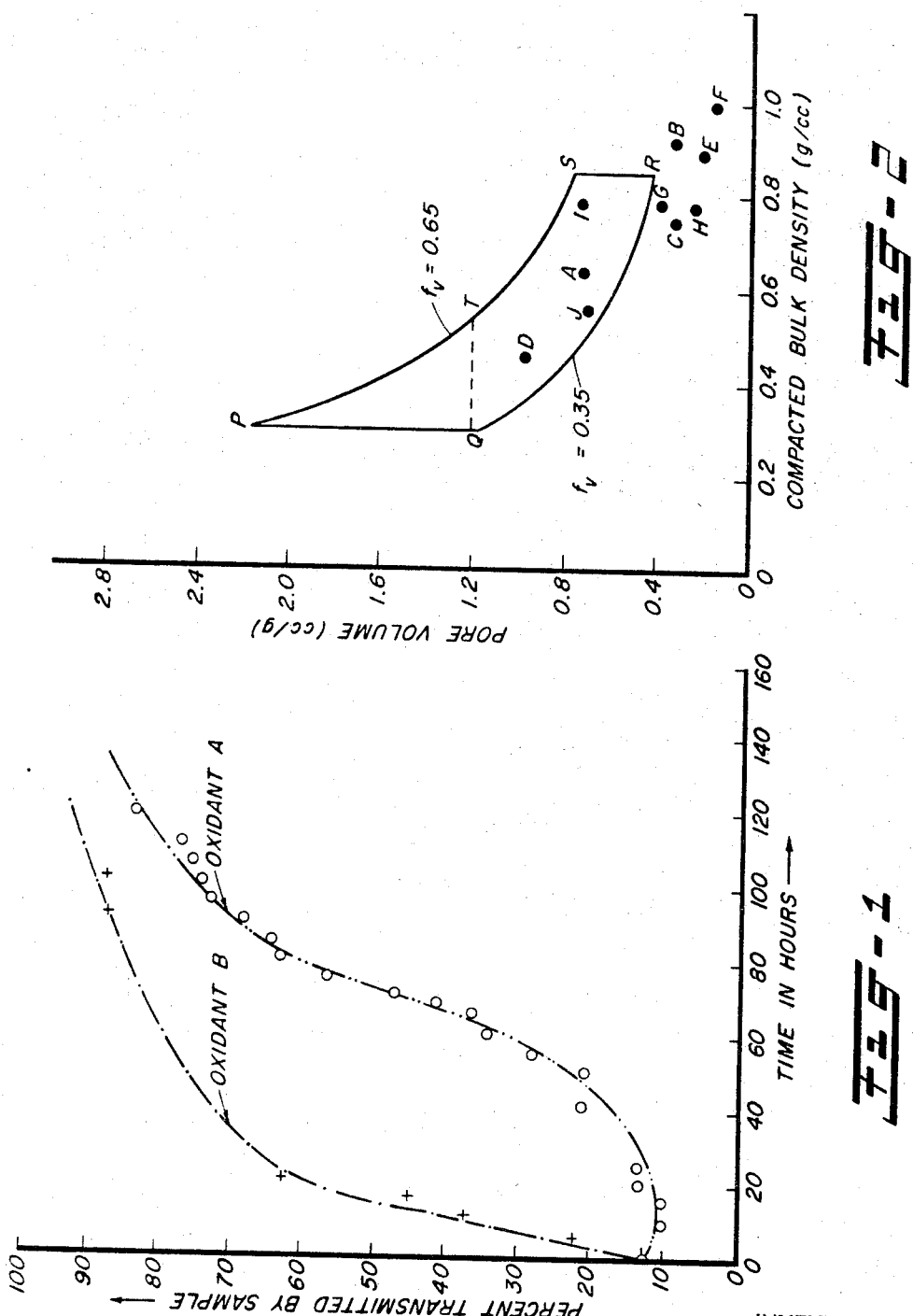

---

3,421,837
SOLID OXIDANT AND METHOD FOR DEODORIZING AIR THEREWITH
Robert Henry Ebel, Riverside, Stephen Fred Adler, South Norwalk, and Janis J. Keggi, Stamford, Conn., assignors to American Cyanamid Company, Stamford, Conn., a corporation of Maine
Continuation-in-part of application Ser. No. 346,309, Feb. 20, 1964. This application Sept. 28, 1966, Ser. No. 582,666
U.S. Cl. 21—53                                    7 Claims
Int. Cl. A61l *13/00*

ABSTRACT OF THE DISCLOSURE

Air is deodorized by contacting it with a supported solid oxidant composed essentially of an activated dried formed alumina having a void fraction, determined by multiplying its apparent bulk density (which is about 0.3 to 0.85 gram per cc.) by its pore volume, of about .35 to .65 and impregnated with about 0.5 to 3 pounds per cubic foot of potassium permanganate.

---

This application is a continuation-in-part of copending application Ser. No. 346,309 filed Feb. 20, 1964, now abandoned.

This invention relates to the deodorization of air and more particularly relates to supported solid oxidant compositions and to the method for deodorizing air therewith.

U.S. Patent No. 3,049,399 is directed to compositions of matter for deodorizing air which comprise an inorganic activated water adsorbing substrate which is impregnated with a permanganate oxidant. This patent, the subject matter of which is incorporated herein by reference, notes that the activated hydrophilic water adsorbing substrate having a permanganate salt deposited in the pores thereof may be silica gel, alumina silica-alumina, activated bauxite and activated clays.

Our investigative efforts demonstrate that supported solid oxidants of the type described generally in the above referred to reference, when impregnated with a permanganate, exhibit some measure of activity for deodorizing air. However, in general the level of activity proves to be unacceptably low or the final supported solid oxidant material may prove sufficiently heavy to require extensive mechanical support, thus minimizing the suitability of the said oxidant for use particularly in portable units. Further, frequently the said oxidants therein described are of such character as to be of extremely short life in the deodorization of air in that supported oxidants formed therewith become inactive prior to the full utilization of the permanganate salts employed to impregnate these substrates.

Accordingly, it is an object of the present invention to provide a supported solid oxidant of the type suitable for use in the deodorization of air which constitutes an improvement over the general class of compositions described in the above referred to United States patent.

More specifically, it is an object of this invention to provide a supported solid oxidant of the type generally described in the above referred to U.S. patent which employs a hydrophilic substrate of such character that the activity of the said solid oxidant is retained for substantially longer periods of time when compared with other substrates within the contemplation of the above referred to patent by allowing for the substantially full utilization of the permanganate content of the supported oxidant.

It is a further specific object of this invention to provide supported solid oxidants which are capable of being employed as thinner, lighter beds of oxidant material with a life comparable to thicker, heavier beds of materials outside the scope of this invention, due to the fact that the activity of the oxidant of this invention is sufficiently improved to permit the utilization of smaller amounts of supported solid oxidant material. Thus, with the oxidant of this invention less extensive mechanical support will be required for the oxidant whether it be in a fixed or portable unit.

These and other objects and advantages of the present invention will become more apparent from the detailed description thereof set forth hereinbelow and the accompanying drawings, in which FIG. 1 is a graph comparing two seemingly closely related supported solid oxidants for their ability to purify air; and FIG. 2 is a graphical representation of the combination of physical properties essential for the oxidants of this invention.

It will be seen from FIG. 1 that a preferred supported solid oxidant of this invention, Solid Oxidant A, is dramatically more effective than the other solid oxidant reported. Details upon which FIGS. 1 and 2 are based will be described more fully hereinafter.

It is common practice in the art dealing with porous materials to describe those materials in terms of pore volume, surface area, average pore diameter, pore-size distribution and the like. However, we have found it useful to use the concept of "void fraction" to delineate and distinguish the improved compositions of our invention from the generic class of hydrophilic materials of the prior art. The void fraction, $f_v$, is, in fact, that fraction of the total reactor volume that is in the pores of the porous material in the reactor. Experimentally, it is obtained by cross-multiplying the apparent bulk density (ABD) in grams/cc. and the total pore volume (PV) in cc./gram, and it is a dimensionless quantity, the value of which can vary in theory from 0.0 to 1.0.

We have found that supported solid oxidants characterized by a void fraction in excess of 0.35 and up to approximately 0.65 are substantially and unexpectedly superior in their air-purifying efficiencies and their useful life when compared to those oxidants having $f_v$ less than 0.35. It is, of course possible to arrive at values of $f_v$ by an infinite combination of densities and pore volumes. For example, $f_v=0.40$ is obtainable from an ABD equal to 1.0 g./cc. and a PV equal to 0.40 cc./g. or an ABD equal to 0.30 g./cc. and a PV equal to 1.33 g./cc. However, we have found that in general solid oxidants having apparent bulk densities of about 0.85 g./cc. and above contribute an undesirably high weight to the unit in which they are used. We have also found that porous materials having a density of about 0.3 g./cc. or below are lacking in physical strength and are prone to breakage, abrasion and other forms of physical wear and tear. This is an undesirable characteristic in any supported oxidant to be used in an air purifying application.

Consequently, we have found that a combination of light weight and physical strength, compatible with high efficiency and long duration of air-purifying operation, are provided when the void fraction, $f_v$, is in the range of 0.35 to 0.65 while, at the same time, the apparent bulk density is in the range of from about 0.30 to about 0.85 g./cc.

Furthermore, we prefer supported solid oxidants having the aforementioned physical characteristics that additionally have a pore volume of about 1.20 cc./g. or less. In FIG. 2, this region is depicted as the area QRST, the preferred portion of the larger area defining the compositions of our invention, PQRS.

It should be noted that as the term "activated alumina" and similar expressions are employed herein, it includes alumina per se, and compositions containing as little as 10%, though preferably at least 25% by weight of alumina, based on the total composition, and the balance one or more other hydrophilic inorganic oxides. Typically, other such oxides include silica, magnesia, thoria, zirconia and the like.

The preferred activated alumina employable as a substrate in the preparation of the supported solid oxidants of this invention may be prepared in accordance with a number of procedures generally known and recognized in the catalyst manufacturing industry and, insofar as we are aware, may be an alumina of any of the conventional species such as gamma or eta, among others, although gamma alumina is greatly preferred.

Alumina of suitable activity thus may be prepared by precipitation from a water solution of a water-soluble aluminum compound which may be either an aluminum salt such as aluminum sulfate, aluminum nitrate, aluminum chloride and the like, or an alkali metal aluminate, such as sodium or potassium aluminate. Thus, such alumina may be prepared in accordance with U.S. Patent No. 2,657,115 and as specifically modified by the procedure set forth in U.S. Patent No. 3,086,845 and U.S. Patent No. 3,032,514, among others.

Typically, in accordance with this invention, the alumina precursor, i.e., aluminum hydroxide, is precipitated at a pH of from 7.5 to 8.0 by the simultaneous addition of solutions of sodium aluminate and aluminum sulfate to a heel of water in an agitated vessel. The conditions of the precipitation, pH, agitation, rates and amounts of solution added, and temperature are all carefully controlled to regulate the filtration and washing characteristics of the resulting precipitate as well as the porosity of the final product. Typically, the resulting slurry of precipitated alumina is adjusted to pH above 10 by the addition of alkaline material and the slurry is aged prior to filtration.

In a first filtration stage, the slurry may be fed to a rotary vacuum filter where it is filtered, washed and usually decationized. The first filter cake, which may contain up to 0.5% $Na_2O$ and 0.2% $SO_4$, may be repulped to an $Al_2O_3$ content of from 7 to 8% and then treated with decationized water. The pH of the slurry may then be adjusted downwardly, as for example to from 7.5 to 8, by addition of acid and a second filtration-washing operation employed to lower the soda content of the cake, if desired, to below .02% based on the alumina.

Normally, the washed cake is reslurried to a pumpable consistency of about 15% and is thereafter formed preliminary to impregnation with the permanganate salt.

Typically, the solid oxidant substrates contemplated by this invention may be formed as pellets or pills, beads, extrudates, rings, saddles, or in other forms. Preferably, the formed substrate is an extrudate and to this end a reslurried washed second-stage filter cake may be dried to a suitable consistency for extrusion or may be spray-dried prior to modification by the addition of slurry preliminary to extrusion. In the case of the latter, the spray drying may be accomplished by spraying the composition through a nozzle or off a spray wheel into contact with hot gases. Such drying may be accomplished by any suitable spray drier. One that has been employed with success is described in U.S. Patent No. 2,644,516, dated July 7, 1953. Although gas inlet temperatures of up to 1300° F. may be employed, the temperatures of the drying gases entering the spray drying chamber are preferably controlled within the range of about 400 to 1000° F. so that the alumina gel is converted into set partially dehydrated microspheroidal gel particles. Spray drying usually results in an alumina characterized by a volatile content of from about 20 to 25%.

As noted above, extruder feed mix may be prepared by blending the spray dried microsphere powder and slurry in a muller to produce a solids content in the range of about 25 to 40% prior to being fed to the extruder.

After extrusion, the extrudates are overdried and subsequently calcined at temperatures of up to 1300° F. to convert the alumina to the activated form.

The permanganates which may be employed are the permanganates of potassium, sodium, magnesium, calcium and barium. Potassium permanganate is preferred. The permanganate is employed in the supported solid oxidants of this invention in an amount sufficient to result in an oxidant capable of deodorizig air. Typically, this will amount to about 1.8 lbs. of permanganate as equivalents of potassium permanganate per cubic foot of alumina solids and usually an amount of from between 0.5 and 3.0 lbs. of permanganate expressed as equivalents of potassium permanganate will be employed.

In a typical impregnation in which the extrudates are calcined and formed preliminary to the incorporation of the permanganate, a mixture of the permanganate is made up with deionized water and warmed to insure the complete solution of the salt. With the knowledge of the apparent bulk density and pore volume of the extrudates, the amount of permanganate required to introduce a given level of permanganate in the final solid oxidant may be readily calculated.

In a typical procedure, calcined extrudates are weighed out and placed in a rotating drum. The permanganate solution is introduced into the drum where it is sprayed onto the tumbling extrudates in a manner whereby uniform distribution of the permanganate is achieved.

After impregnation, the extrudates are dried to remove the bulk of the moisture and when dried to the extent that there is no apparent change in weight they are preferably stored in tightly sealed metal containers.

In carrying out the process of this invention, odor-containing air, as for example that which may be found in rooms normally subject to the heavy accumulation of smoke from cigarettes and the like, refrigerators, elevators, etc., is caused to be placed in contact with the oxidant of this invention as by passing it through a bed of said solid oxidant so as to enable the permanganate to oxidize such major odors as tobacco (nicotine), body, cooking odors and the like to carbon dioxide, water or other odorless oxidation products.

NICOTINE REMOVAL TEST PROCEDURE

In order to demonstrate the effectiveness of the supported solid oxidants of this invention as compared with other seemingly similar oxidants, a nicotine removal apparatus is employed whereby in the use of which the ability of various oxidants to purify nicotine-laden air is recorded. The requirements for running the test reproducibly are a carefully metered flow of air with a controlled and known amount of moisture and nicotine therein and a reliable method of measuring the nicotine level in an untreated air stream and in a treated stream.

Typically, in this test procedure, the results of which are known to correspond reliably with actual room tests in which odor-laden air is exhausted from a room and then caused to flow through a bed of the oxidant of this invention, clean, dry, regulated air enters a device and the stream is split into four equal portions. One stream of this air passes through a series of water saturators; another passes through a series of nicotine saturators; and the remaining two streams are used as diluents for the saturated streams so that any desired level of moisture or nicotine may be achieved. All four streams pass through rotameters where adjustments in the flow rate are made. The lines then come together and the mixed gas stream goes through a container in which a moisture gauge is located. This gauge is a check on the relative humidity of the incoming stream and the reading should be predictable from a knowledge of the relative volumes of the four component streams. The gas stream then enters the inlet manifold with sufficient pressure to overcome a hydrostatic backpressure. Attached to the manifold are a number of taps, and mounted in each of these is another rotameter, a sample tube and a two-way stop-cock in series. The sample tube holds a fixed volume of granulated solid oxidant, typically 6–8 mesh, except for the case of that tube which is used to monitor the untreated stream. In that case, no oxidant is used. Granular oxidant is required in this test because a miniature reactor is used and wall-effects have to be minimized. Thus, this test measures inherent activity and not some spurious effect resulting from a size or shape difference among the various oxidants. The two-way stop-cock allows one to send the effluent gas stream either to a flame ionization detector or to a vent. Both sides of the stop-cock are equipped with needle valves to allow for flow adjustment so that all tubes in the set-up are running at the same flow rate. The side of the stop-cock leading to the flame ionization detector is attached to another manifold which is attached to a hydrostatic back-pressure. The flame ionization detector is a standard piece of equipment which measures the combustible carbon content of any air stream and the output of the detector is sent to a circular chart recorder so that the performance of the oxidants may be followed as a function of time.

In this way, the signal of the recorder charts is compared for the untreated air stream with the signal for any other sample tube and a direct measurement of the relative conversion of the nicotine for the oxidant in the tube results.

In the following examples reference is made to physical properties such as pore volume, surface area and the like. In general, these are determined in accordance with Cyanamid's Test Methods for Synthetic Fluid Cracking Catalyst of January 1957. Apparent Bulk Density (ABD) is determined by slowly pouring 100 grams of calcined extrudates into a graduated cylinder and determining the volume of said extrudates. The ABD is equal to the weight of the material divided by its volume. Crush strength is determined by placing an extrudate on its side between two parallel plates. Force is applied to the top plate by means of pneumatic pressure until the extrudate is crushed. The device is such that the air pressure in pounds to cause crushing is the crush strength of the extrudate.

Pore volume is a property of porous substances readily determined by a liquid titration. For substances containing water-soluble salts, an organic liquid such as carbon tetrachloride, is added to a known weight of particles. Water is otherwise used. By the addition of small increments of organic liquid and continual stirring to redistribute the liquid, an end-point is reached at which the particles cling together. This occurs because when the interior porosity is filled with liquid, additional liquid causes the external particle surface to become and remain wet and the particles cling together because of the meniscus of fluid that forms between them. The pore volume is determined by measuring the increase in weight of the particles and converting this to the corresponding volume.

$$\text{Pore volume (cc./g.)} = \frac{\text{Wt. of liquid added (g.)}}{\text{Density of liquid (g./cc.)}}$$

weight of particles (g.). Surface area is generally determined by a $N_2$ adsorption test at liquid nitrogen temperature.

EXAMPLE 1

(A) Preparation of alumina 1230 gal. decationized water was drawn in a 3000-gal. strike tank and the temperature was adjusted to 90° F. The large diameter turbine agitator was set at 30 r.p.m. Addition of 242 gal. of 28% $Al_2O_3$ sodium aluminate solution (at 15% excess $Na_2O$) was started, adjusting the rate to 4 gal. per minute. Immediately thereafter, addition of 428 gal. of 7.6% $Al_2O_3$ aluminum sulfate solution was started at 8 gal. per minute. The alum solution flow rate was then further finely adjusted using an automatic pH controller to maintain the pH of the tank mixture at 7.5. Additions of both solutions were continued at these approximate rates, holding the mix pH at 7.5, for a period of 50 minutes, at which time the required volume of alum solution had been added. Alum flow was stopped; sodium aluminate flow was continued until the mix pH reached 10.6. The mixture pH remained at 10.6 for 30 minutes, further addition of aluminate solution not being required. The slurry then contained 6.9% of precipitated alumina (1250 lb. $Al_2O_3$). Following the 30-minute aging period, the slurry was filtered and washed as described above and spray dried.

The spray dried alumina after calcining for 1 hour at 1100° F. has a pore volume of 1.2 cc./g., an apparent bulk density of 0.25 g./cc., a surface area of 250 m.²/g. and a pore diameter averaging about 200 A.

The sodium aluminate solution used in this example was produced by adding 1400 lb. Bauxite Ore Concentrate (BOC) to 1800 lb. of 45% NaOH solution, heating at 230°–240° F. until a clear solution was obtained. The alum solution was produced by dissolving 545 lb. BOC in 2000 lb. hot 50% sulfuric acid, adding water to dilute to 7.6% $Al_2O_3$.

(B) Extrusion

Twenty lb. of spray dried precipitated alumina at 75% solids were charged to a 2 cu. ft. muller. Thirty-one lb. water were added, then 12¾ lb. additional powder, resulting in a mix solids content of 38%. The pH was adjusted to 8.9 by adding 100 cc. aqueous ammonia (28% $NH_3$). The mixture was mulled for thirty minutes, then 5 portions of the mix were fed to a 2" Welding Engineers, Inc., Dual Worm Extruder, using different hole size dies for each portion. Small samples were dried in a drying test unit by forcing air at 60° C. through a bed of extrudates, requiring about 40 minutes to dry to 70% solids. Dried extrudates were then calcined for one hour at 1300° F., and pellets were tested with the following results:

RESULTS OF TEST EXTRUSIONS OF SPRAY-DRIED ALUMINA

| | | | | | |
|---|---|---|---|---|---|
| Die hole size | 0.313 | 0.250 | 0.154 | 0.104 | 0.0935 |
| Calcined pellet diameter | 0.258 | 0.203 | 0.127 | 0.083 | 0.074 |
| Calcined pellet length | 0.328 | 0.294 | 0.275 | 0.225 | 0.213 |
| Crush strength, lb | 26.5 | 25.2 | 31.4 | 28.2 | 25.8 |
| Crush strength per unit of length, lb./in | 81 | 86 | 114 | 125 | 121 |
| ABD, g./cc | | | | 0.58 | 0.58 |
| PV, cc./g | | | | 0.75 | 0.76 |

(C) Preparation of final oxidant particles

Spray dried precipitated alumina was charged to a weigh hopper in the amount of 526 lb. at 75% solids. Three hundred lb. of this amount were added to an intensive mixer of 18 cu. ft. capacity. Eight hundred and thirty lb. of washed precipitated alumina slurry at 14.6% solids were then added to the muller and the mixture was mulled for 15 minutes. The remainder of the powder was added, resulting in a mix solids content of 37½%. The pH of the mix was adjusted to 8.8 by adding slowly 20 lb. of ammonium hydroxide solution (12% $NH_3$). After 30 minutes of additional mulling, the mixture was fed to a 3.5" Welding Engineers, Inc., Dual Worm Extruder, equipped with a die plate having 32¼" die holes.

The alumina extrudates are oven dried at 250° F. for at least 16 hours and are calcined at temperatures up to 1100° F., at which temperature they are held for an additional hour, whereby gamma alumina extrudates of this invention are produced which are suitable for permanganate impregnation.

The unimpregnated alumina extrudates had an apparent bulk density of 0.57 gram per cc. and a pore volume of 0.77 cc. per gram and therefore a void fraction ($f_v$) of 0.44.

These extrudates are impregnated with potassium permanganate solution so that the final product will have 1.8 lbs. of potassium permanganate ($KMnO_4$) per cubic foot of oxidant.

To this end, 0.506 lbs. of potassium permanganate was made up into solution with 7.7 lbs. of deionized water, which solution was heated to insure that the permanganate salt was completely dissolved. This solution was then used to impregnate 10 lbs. of extrudates.

The calcined extrudates were then weighed out and placed in a rotating drum and the permanganate solution sprayed onto the tumbling extrudates. Uniform distribution of the permanganate solution was achieved and the drum was allowed to continue to rotate for an additional time period to insure uniformity of impregnation.

The impregnated wet extrudates were then dried to remove the bulk of the moisture. The extrudates are removed from the drying equipment as soon as there is no apparent change in weight between successive weighings. In order to insure the fact that the initially purple oxidant particles do not become discolored the material is stored in tightly sealed metal containers.

The final oxidant particles so prepared were found to have an apparent bulk density of 0.63 gram per cc. and a pore volume of 0.71 cc. per gram, and therefore an $f_v$ of .45, a surface area of 258 m.$^2$/g. and a potassium permanganate content of 4.5% by weight. The physical properties are determined according to methods described earlier. The KMnO$_4$ content is determined by crushing a sample, leaching with distilled water and analyzing for KMnO$_4$ by the standard ferrous-ceric titration method.

EXAMPLE 2

Employing the nicotine removal test procedure referred to above, the solid oxidant of Example 1 (Oxidant A) was compared with solid Oxidant B, which would appear to be a composition seemingly closely related to that prepared in Example 1. Sample volumes of 0.9 cc. were used in this test.

With respect to the supported solid oxidants, they are characterized by the following properties:

| Oxidant | Pore volume (cc./gram) | Apparent bulk density (g./cc.) | Surface area (m.$^2$/g.) | Potassium permanganate content (lbs./cubic ft. of bulk) | Void fraction ($f_v$) |
|---|---|---|---|---|---|
| A | 0.71 | 0.63 | 258 | 1.79 | .45 |
| B (commercially available alumina) | 0.33 | 0.92 | 256 | 1.5 | .30 |

By referring to FIG. 1, it will be seen that the supported solid oxidant of this invention maintains a lower percent of transmittal of nicotine for substantially longer periods of time in hours than Oxidant B, a seemingly closely related material.

EXAMPLE 3

To further demonstrate the uniqueness of the supported solid oxidants of this invention employing alumina substrates characterized by pore volumes and apparent bulk densities as contemplated by this invention, a series of tests were carried out employing the accelerating aging process or procedure described hereinabove and referred to in Example 2 except that a 1″ deep bed of granules was used in a 10 mm. inside diameter tube. This corresponds to about 2 cc. of volume.

These supported oxidants are labeled Oxidants C through J and are identified by composition and physical properties in the table set forth hereinbelow.

Employing the test procedure referred to in this example, these solid oxidants were compared with the following results:

PERFORMANCE OF VARIOUS OXIDANTS

| Oxidant | Lifetime (time in hours to reach 85% transmission of nicotine) | Efficiency (relative to oxidant A) |
|---|---|---|
| A | 220 | 1.00 |
| B | 160 | 0.60 |
| C | 160 | 0.90 |
| D | 140 | 0.70 |
| E | 85 | 0.50 |
| F | 110 | 0.65 |
| G | 85 | 0.35 |
| H |  | 0.30 |
| I | 250 | 1.30 |
| J | 130 | 0.85 |

The efficiency of a supported solid oxidant in this test is given by the amount of nicotine removed. Referring to FIGURE 1, this amount is proportional to the area above the transmission-time curve. The efficiency (relative to Oxidant A) is obtained by calculating the ratios of these areas. Thus, for Oxidant A, the relative efficiency is 1.00 by definition.

It will be evident from Example 3 hereinabove that only when the substrate is characterized by a void fraction of from .35 to .65 are truly effective supported solid oxidants provided.

It is believed to be apparent that many additives or modifiers may be incorporated into the supported solid oxidant compositions of this invention in amounts and in such manners that they do not interfere with the essential physical characteristics of the solid substrate nor prevent the amount of permanganate salt employed being an effective one.

What is claimed is:

1. A supported solid oxidant comprising an activated dried formed alumina impregnated with an amount of a permanganate sufficient to enable the oxidant to be employed in the deodorization of air, the resulting impregnated product being characterized by a void fraction of from about 0.35 to about 0.65 and having an apparent bulk density of from about 0.30 to about 0.85 gram/cc., the amount of said permanganate being within the range of about 0.5 to 3 pounds of permanganate, calculated as potassium permanganate, per cubic foot of alumina solids.

2. A supported solid oxidant according to claim 1 wherein the activated dried formed alumina is impregnated with at least 1.8 pounds of potassium permanganate per cubic foot of solid.

3. A supported solid oxidant according to claim 1 in which the activated dried formed alumina is prepared from a precipitated alumina.

4. A supported solid oxidant according to claim 1 in which the activated dried formed alumina is an activated dried precipitated alumina extrudate.

5. A supported solid oxidant according to claim 2 in

| Oxidant | Pore volume (cc./gram) | Apparent bulk density (g./cc.) | Surface area (m.$^2$/g.) | Potassium permanganate content (lbs./cubic ft. of bulk) | Void fraction ($f_v$) |
|---|---|---|---|---|---|
| A (preferred oxidant of this invention) | 0.71 | 0.63 | 258 | 1.79 | 0.45 |
| C (activated bauxite ore concentrate BOC) | 0.33 | 0.75 | 250 | 1.53 | 0.25 |
| D (25% alumina, silica-alumina) | 0.98 | 0.46 | 238 | 1.4 | 0.45 |
| E (activated BOC) | 0.20 | 0.895 | 184 | 2.32 | 0.18 |
| F (precipitated alumina) | 0.16 | 1.0 | 136 | 1.35 | 0.16 |
| G (activated clay) | 0.39 | 0.785 | 81 | 1.02 | 0.31 |
| H (silica-magnesia) | 0.34 | 0.78 | 495 | 0.51 | 0.27 |
| I (Heard sol-type alumina) | 0.73 | 0.79 | 236 | 2.2 | 0.58 |
| J (precipitated 5% silica, 95% alumina) | 0.70 | 0.56 | 228 | 1.35 | 0.39 | which the activated dried formed alumina is further characterized by a pore volume equal to or less than about 1.2 cc./gram.

6. A process for deodorizing air which comprises bringing the odor-containing air in contact with a supported oxidant of claim 2.

7. A process for deodorizing air which comprises bringing the odor-containing air into contact with a supported solid oxidant of claim 5.

References Cited

UNITED STATES PATENTS

| | | | |
|---|---|---|---|
| 2,644,516 | 7/1953 | Brendel | 159—4 |
| 2,657,115 | 10/1953 | Ashley | 23—143 |
| 3,032,514 | 5/1962 | Malley et al. | 252—465 |
| 3,049,399 | 8/1962 | Gamson et al. | 21—53 |
| 3,086,845 | 4/1963 | Malley et al. | 252—463 XR |
| 3,226,332 | 12/1965 | Lincoln et al. | 252—186 XR |

OTHER REFERENCES

Perry's Chemical Engineers' Handbook, Perry, Chilton, Kirkpatrick, 4th ed., McGraw-Hill, 1963, New York (page 16–4 relied upon), (copy in group 171).

MORRIS O. WOLK, *Primary Examiner.*

J. ZATARGA, *Assistant Examiner.*

U.S. Cl. X.R.

21—55, 58, 74; 23—4; 55—74; 252—186, 454